(12) United States Patent
Hanebuth et al.

(10) Patent No.: US 10,557,206 B2
(45) Date of Patent: Feb. 11, 2020

(54) ELECTROLYSIS MEMBRANE SYSTEMS AND METHODS

(71) Applicant: Siemens Aktiengesellschaft, Munich (DE)

(72) Inventors: Marc Hanebuth, Nuremberg (DE); Hagen Hertsch, Erlangen (DE); Michael Sawinsky, Buttenheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 198 days.

(21) Appl. No.: 15/540,850

(22) PCT Filed: Dec. 8, 2015

(86) PCT No.: PCT/EP2015/078979
§ 371 (c)(1),
(2) Date: Jun. 29, 2017

(87) PCT Pub. No.: WO2016/116211
PCT Pub. Date: Jul. 28, 2016

(65) Prior Publication Data
US 2017/0335476 A1 Nov. 23, 2017

(30) Foreign Application Priority Data

Jan. 19, 2015 (EP) ..................................... 15151622

(51) Int. Cl.
*C25B 15/02* (2006.01)
*B01D 65/10* (2006.01)
(Continued)

(52) U.S. Cl.
CPC ................ *C25B 15/02* (2013.01); *C25B 1/10* (2013.01)

(58) Field of Classification Search
CPC .......... C25B 15/02; C25B 1/10; B01D 65/102
See application file for complete search history.

(56) References Cited

U.S. PATENT DOCUMENTS

| 4,532,018 A * | 7/1985 | Wright ..................... C25B 15/02 205/335 |
| 2001/0039481 A1* | 11/2001 | Tremblay ................ C25B 15/02 702/35 |
| 2007/0208519 A1* | 9/2007 | Veillette .................... G01D 3/08 702/35 |

FOREIGN PATENT DOCUMENTS

| EP | 1473386 A1 | 11/2004 |
| EP | 2006418 A2 | 12/2008 |

(Continued)

OTHER PUBLICATIONS

European Search Report, Application No. 15151622.6, 6 pages, dated Jul. 6, 2015.
(Continued)

*Primary Examiner* — Nicholas A Smith
(74) *Attorney, Agent, or Firm* — Slayden Grubert Beard PLLC

(57) ABSTRACT

The present disclosure relates to membranes for use in electrolysis systems. The teachings thereof may be embodied in a method for checking a membrane of an electrolyzer comprises two volumes separated by the membrane and produces two product gases from a starting liquid. The method may include: detecting an electrolysis current strength during electrolysis, measuring a liquid flow rate of the starting liquid between the two electrolyzer volumes, calculating a ratio of the measured liquid flow rate and the detected electrolysis current strength, and using the calculated ratio as an indication of membrane leaktightness.

13 Claims, 2 Drawing Sheets

(51) Int. Cl.
*C25B 15/00* (2006.01)
*C25B 1/00* (2006.01)
*C25B 1/04* (2006.01)
*C25B 1/10* (2006.01)

(56) References Cited

FOREIGN PATENT DOCUMENTS

| | | |
|---|---|---|
| JP | 2000054175 A | 2/2000 |
| JP | 2004084042 A | 3/2004 |
| JP | 2006138004 A | 6/2006 |
| JP | 2010121146 A | 6/2010 |
| WO | 2016/116211 A1 | 7/1916 |

OTHER PUBLICATIONS

International Search Report and Written Opinion, Application No. PCT/EP2015/078979, 16 pages, dated Apr. 7, 2016.

* cited by examiner

ELECTROLYSIS MEMBRANE SYSTEMS AND METHODS

CROSS-REFERENCE TO RELATED APPLICATIONS

This application is a U.S. National Stage Application of International Application No. PCT/EP2015/078979 filed Dec. 8, 2015, which designates the United States of America, and claims priority to EP Application No. 15151622.6 filed Jan. 19, 2015, the contents of which are hereby incorporated by reference in their entirety.

TECHNICAL FIELD

The present disclosure relates to membranes for use in electrolysis systems. The teachings thereof may be embodied in a method and a test device for checking a membrane leaktightness of at least one membrane of an electrolyzer which comprises two electrolyzer volumes separated from one another by the at least one membrane and is configured in order to produce two product gases from a starting liquid by means of electrolysis.

BACKGROUND

During the electrolysis of water, two product gases hydrogen and oxygen are formed simultaneously. These product gases must be separated, and must not be mixed with one another. Membranes of the electrolyzer may develop leaks during operation, and then hermetic separation of the two product gases can no longer be ensured. In this case, mixing of the product gases may occur, so that in the extreme case an unsafe operating state may arise. This eventuality must be prevented by suitable measures.

Leaks of membranes of an electrolyzer may, for example, be detected by checking whether a product gas penetrates through a membrane. This procedure requires separate monitoring of the product gases and is relatively expensive. A challenge in the case of an electrolyzer for water electrolysis is, in particular, that water is present in the system, so that together with the two product gases up to three components may be present simultaneously. In a dynamic process, which generally entails temperature and pressure changes, the water content sometimes varies greatly. This makes calibration more difficult, particularly in the case of simple analysis methods. Furthermore, undesired condensation may occur. In a typical technical implementation of the monitoring of the product gases to detect membrane leaks, a relatively small gas flow, diverted from a product gas, is analyzed. With the aid of an actively cooled condenser, for example, the diverted gas can be dried. Time-varying operating pressures can be regulated by a pressure reducer. For example, gas chromatographs, thermal conductivity detectors, or catalytic sensors may be envisioned as detectors. In the presence of hydrogen and oxygen, the latter cause a chemical reaction and thereupon register a temperature increase. Such a procedure has the disadvantage that additional components are required, and that relatively elaborate calibrations need to be carried out.

SUMMARY

The teachings of the present disclosure may be embodied in a method and a test device for checking a membrane leaktightness of at least one membrane of an electrolyzer which comprises two electrolyzer volumes separated from one another by the at least one membrane and is configured in order to produce two product gases from a starting liquid by means of electrolysis. In particular, the method may include checking of the membrane leaktightness of an electrolyzer for water electrolysis, in which water is decomposed into the product gases oxygen and hydrogen, the electrolyzer being for example configured as a proton exchange membrane electrolyzer (so-called PEM electrolyzer) having at least one proton-permeable polymer membrane (PEM=polymer electrolyte membrane). PEM electrolyzers have the advantage that they can be operated very dynamically and are therefore suitable for the use of regenerative surplus current for the production of hydrogen.

An example method for checking a membrane leaktightness of at least one membrane (7) of an electrolyzer (1) which comprises two electrolyzer volumes separated from one another by the at least one membrane (7) and is configured in order to produce two product gases (10, 30) from a starting liquid (50) by means of electrolysis, may include during electrolysis, an electrolysis current strength is detected and a liquid flow rate of the starting liquid (50) between the two electrolyzer volumes is determined, and a ratio parameter (Q), which is proportional to the ratio of the liquid flow rate determined and the electrolysis current strength detected, is formed and is used to check the membrane leaktightness.

In some embodiments, to determine the liquid flow rate, a time variation of a liquid volume of the starting liquid (50) in at least one of the two electrolyzer volumes is determined.

In some embodiments, each of the two electrolyzer volumes comprises a container volume of a separator container (5, 6), in which a product gas (10, 30) and starting liquid (50) are collected, characterized in that the time variation of a liquid volume of the starting liquid (50) in at least one of the two electrolyzer volumes is determined by repeatedly detecting and evaluating a filling level of starting liquid (50) in the container volume of the electrolyzer volume.

In some embodiments, the time variation of a liquid volume of the starting liquid (50) in at least one container volume of an electrolyzer volume is determined by repeatedly detecting and evaluating a gas pressure in the container volume.

In some embodiments, each of the two electrolyzer volumes comprises a container volume of a separator container (5, 6), in which a product gas (10, 30) and starting liquid (50) are collected, characterized in that the liquid flow rate is determined by detecting and evaluating a time variation of a pressure difference between gas pressures in the two container volumes.

In some embodiments, a first ratio threshold value ($Q_{S1}$) for the ratio parameter is specified, and a leak of at least one membrane (7) is inferred when the ratio parameter (Q) exceeds the specified first ratio threshold value ($Q_{S1}$).

In some embodiments, a second ratio threshold value ($Q_{S2}$) for the ratio parameter is specified, and a leak of at least one membrane (7) is inferred when the ratio parameter (Q) falls below the specified second ratio threshold value ($Q_{S2}$).

In some embodiments, the electrolysis is interrupted for an interruption time, the electrolyzer volumes are filled with mutually different liquid amounts of the starting liquid (50), and a time requirement for equalization of the liquid amounts in the two electrolyzer volumes is determined with the aid of a liquid flow rate determined during the interruption time and is used to assess the membrane leaktightness.

In some embodiments, before the determination of the time requirement for equalization of the two liquid amounts, gas pressures in the two electrolyzer volumes are equalized to one another.

In some embodiments, before the determination of the time requirement for equalization of the two liquid amounts, gas pressures in the two electrolyzer volumes are equalized to an ambient pressure in an environment of the electrolyzer (1).

In some embodiments, the liquid flow rate is determined repeatedly during the interruption time, and the time requirement for equalization of the two liquid amounts is determined with the aid of an extrapolation of the liquid flow rates detected.

The teachings of the present disclosure may be embodied in a test device (3) for checking a membrane leaktightness of at least one membrane (7) of an electrolyzer (1) which comprises two electrolyzer volumes separated from one another by the at least one membrane (7) and is configured in order to produce two product gases (10, 30) from a starting liquid (50) by means of electrolysis. The test device (3) may include: an ammeter (60) for detecting an electrolysis current strength of the electrolyzer (1), a measuring device (8) for detecting a liquid amount of the starting liquid (50) in at least one of the two electrolyzer volumes and an evaluation unit for determining a liquid flow rate of the starting liquid (50) between the two electrolyzer volumes with the aid of the measurement values detected by the measuring device (8).

In some embodiments, each of the two electrolyzer volumes comprises a container volume of a separator container (5, 6), in which a product gas (10, 30) and starting liquid (50) are collected, characterized in that the measuring device (8) comprises at least one filling level sensor (9) for detecting a filling level of the starting liquid (50) in a container volume and/or at least one pressure sensor (15) for detecting a gas pressure in a container volume.

BRIEF DESCRIPTION OF THE DRAWINGS

The above-described properties, features and advantages of this invention, as well as the way in which they are achieved, will become more clearly and readily comprehensible in conjunction with the following description of the exemplary embodiments, which will be explained in more detail in connection with the drawings, in which.

DETAILED DESCRIPTION

Figure 1:
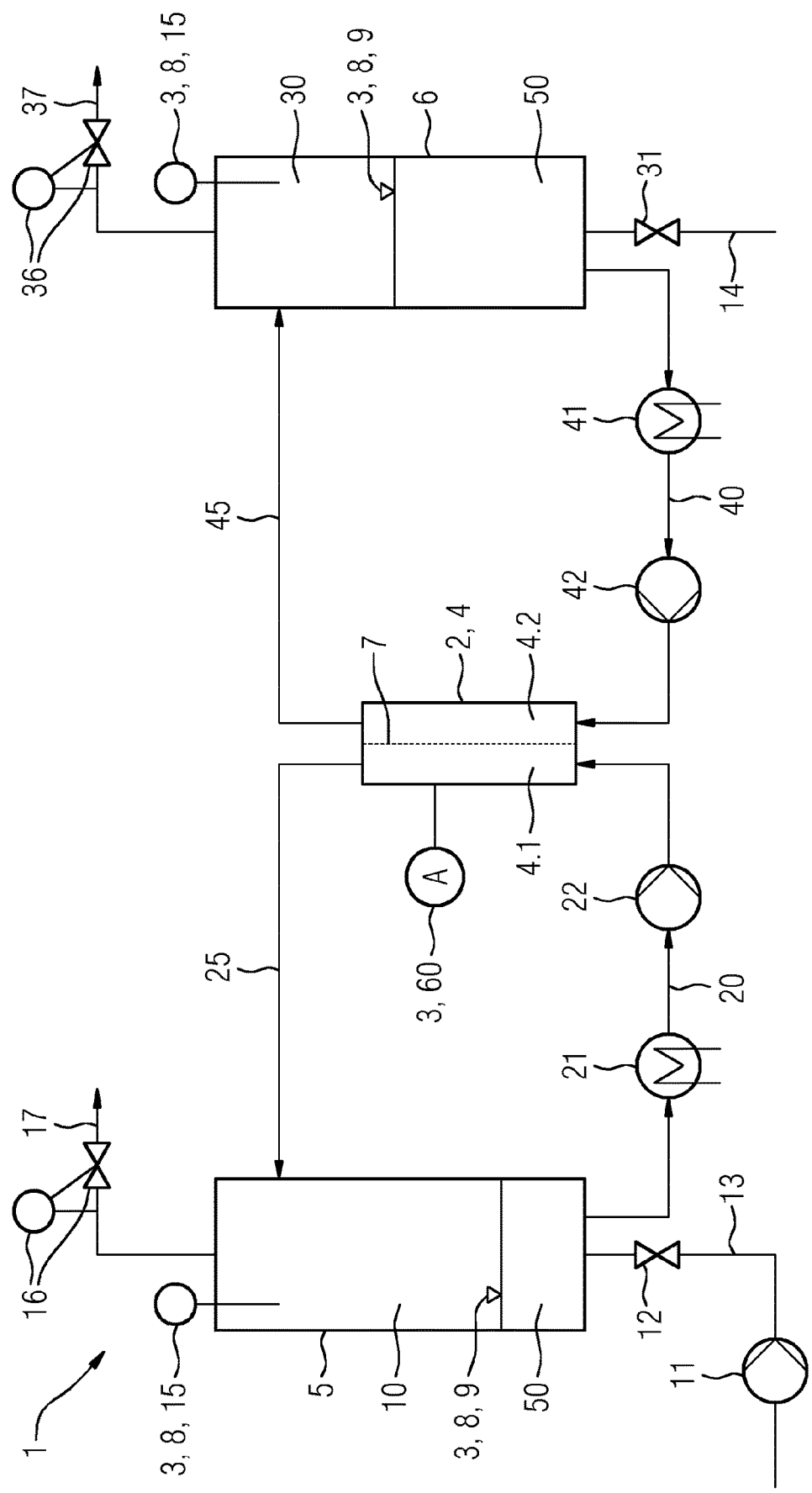
FIG. 1 shows a block diagram of an electrolyzer and a device for checking a membrane leaktightness of the electrolyzer.

In some example methods for checking a membrane leaktightness of at least one membrane of an electrolyzer which comprises two electrolyzer volumes separated from one another by the at least one membrane and is configured in order to produce two product gases from a starting liquid by means of electrolysis, a liquid flow rate of the starting liquid between the two electrolyzer volumes is determined and is evaluated in order to check the membrane leaktightness.

An example method may be used for monitoring the membrane leaktightness of an electrolyzer not with the aid of gas analyses of product gases, but instead by analysis of a liquid flow rate of the starting liquid through the at least one membrane of the electrolyzer, which is manifested as a liquid flow rate between the two electrolyzer volumes separated by the at least one membrane. Besides the molecules of a product gas, molecules of the starting liquid that are not involved in the electrolysis also penetrate through the at least one membrane and therefore pass from one electrolyzer volume into the other electrolyzer volume. In the event of a leak of a membrane, more molecules of the starting liquid can penetrate through this membrane, which leads to a change in the liquid flow rate between the two electrolyzer volumes. Determination of this liquid flow rate therefore makes it possible to check the membrane leaktightness.

The method therefore allows checking of the membrane leaktightness without an elaborate gas analysis and calibration. In particular, in contrast to gas analysis methods, the method can be carried out without diverting a gas flow and without additional detectors or gas analysis of the diverted gas flow, such as gas chromatographs, thermal conductivity detectors or catalytic sensors. To carry out the method, only sensors for determining the liquid flow rate between the two electrolyzer volumes, and in one configuration of the method as described below ammeters for detecting electrolysis current strengths, are required. Such sensors are generally provided anyway as component parts of an electrolyzer, so that no additional sensors are required to carry out the method. Furthermore, the method allows reliable checking of the membrane leaktightness because of the high measurement accuracy of sensors for determining the liquid flow rate and electrolysis current strength.

In some embodiments, to determine the liquid flow rate, a time variation of a liquid volume of the starting liquid in at least one of the two electrolyzer volumes is determined. A time variation of a liquid volume of the starting liquid in at least one of the two electrolyzer volumes can be determined simply and precisely by measurement technology, for example by means of filling level sensors, and is therefore suitable for determining the liquid flow rate between the electrolyzer volumes.

In general, each of the two electrolyzer volumes comprises a container volume of a separator container, in which a product gas and starting liquid are collected. The time variation of a liquid volume of the starting liquid in at least one of the two electrolyzer volumes is determined by determining a time variation of a liquid volume of the starting liquid in the container volume of the electrolyzer volume. The time variation of a liquid volume of the starting liquid in the container volume of an electrolyzer volume is, for example, determined by repeatedly detecting and evaluating a filling level of starting liquid in the container volume, and/or by repeatedly detecting and evaluating a gas pressure in the container volume, and/or by detecting and evaluating a time variation of a pressure difference between gas pressures in the two container volumes.

The aforementioned configurations make use of the fact that a liquid volume of the starting liquid in a separator container can be determined particularly simply and precisely by detecting a filling level of the starting liquid and/or a gas pressure in the separator container and/or a pressure difference between gas pressures in the two separator containers. During electrolysis, an electrolysis current strength is detected and a ratio parameter, which is proportional to the ratio of the liquid flow rate determined and the electrolysis current strength detected, is formed and is used to assess the membrane leaktightness.

In general, the ratio of the amounts of a product gas and of the starting liquid, which penetrate through a membrane, is to a good approximation constant. In the event of a leak of a membrane an additional transport path is formed for the starting liquid through the membrane, and this ratio changes. This ratio is therefore suitable as a parameter for assessing the membrane leaktightness. In this case, the electrolysis current strength is a simply accessible measurement quantity that is a measure of the amount of a product gas penetrating through the membrane. A ratio parameter which is proportional to the ratio of the liquid flow rate determined and the electrolysis current strength detected is therefore particularly advantageously suitable for assessing the membrane leaktightness.

In some embodiments, a first ratio threshold value for the ratio parameter is specified, and a leak of at least one membrane is inferred when the ratio parameter exceeds the specified first ratio threshold value, and/or a second ratio threshold value for the ratio parameter is specified, and a leak of at least one membrane is inferred when the ratio parameter falls below the specified second ratio threshold value. These embodiments define easily testable criteria for detecting a leak of at least one membrane, which are furthermore proven to be surprisingly reliable. In particular, a specification of the two ratio threshold values defines a tolerance range for values of the ratio parameter, outside which a leak of a membrane is inferred. In this way, the starting liquid can pass a leak of a membrane both in the same direction as a product gas penetrates through the membrane and in the opposite direction thereto, the direction depending on the relative level of the pressures in the two electrolyzer volumes.

In some embodiments, the electrolysis is interrupted for an interruption time, the electrolyzer volumes are filled with mutually different liquid amounts of the starting liquid, and a time requirement for equalization of the liquid amounts in the two electrolyzer volumes is determined with the aid of a liquid flow rate determined during the interruption time and is used to assess the membrane leaktightness.

Some methods may include a test procedure for assessing the membrane leaktightness, carried out during an interruption of the electrolysis. In this case, it is merely necessary to determine and evaluate a time requirement for equalization of initially different liquid amounts of the starting liquid in the electrolyzer volumes. A disadvantage, however, is that the electrolyzer is not available for electrolysis operation during the test procedure.

In some embodiments, before the determination of the time requirement for equalization of the two liquid amounts, gas pressures in the two electrolyzer volumes are equalized to one another, and for example to an ambient pressure in an environment of the electrolyzer. Equalization of the gas pressures in the two electrolyzer volumes may define uniform conditions for the test procedure and thereby simplify evaluation of the test procedure for assessing the membrane leaktightness. Equalization of the gas pressures in the two electrolyzer volumes to the ambient pressure in an environment of the electrolyzer can be carried out particularly simply, for example by controlled opening of blow-off lines of the electrolyzer.

In the case of the aforementioned test procedure, for example, the liquid flow rate may be determined repeatedly during the interruption time, and the time requirement for equalization of the two liquid amounts is determined with the aid of an extrapolation of the liquid flow rates detected. This may shorten the test procedure, since the test procedure does not need to be continued until equalization of the two liquid amounts is reached.

Some embodiments may include a test device for checking a membrane leaktightness of at least one membrane of an electrolyzer which comprises two electrolyzer volumes separated from one another by the at least one membrane and is configured in order to produce two product gases from a starting liquid by means of electrolysis comprises a measuring device for detecting a liquid amount of the starting liquid in at least one of the two electrolyzer volumes and an evaluation unit for determining a liquid flow rate of the starting liquid between the two electrolyzer volumes with the aid of the measurement values detected by the measuring device. One configuration of the test device provides an ammeter for detecting an electrolysis current strength of the electrolyzer. According to further configurations of the test device, the measuring device comprises at least one filling level sensor for detecting a filling level of the starting liquid in a container volume and/or at least one pressure sensor for detecting a gas pressure in a container volume.

FIG. 1 shows a block diagram of an electrolyzer 1 and of a test device 3 for checking a membrane leaktightness of at least one membrane 7 of the electrolyzer 1. The electrolyzer 1 may produce two product gases 10, 30 from a starting liquid 50 by means of electrolysis. The starting liquid 50 is for example water, in which case oxygen as a first product gas 10 and hydrogen as a second product gas 30 are produced during the electrolysis.

The electrolyzer 1 comprises a cell block 2 having at least one electrolysis cell 4 and two separator containers 5, 6. Only one electrolysis cell 14 is represented in FIG. 1. However, it will be assumed below that the cell block 2 comprises a plurality of electrolysis cells 4. Each electrolysis cell 4 has a membrane 7, which divides the electrolysis cell 4 into a first subcell 4.1 and a second subcell 4.2. Each first subcell 4.1 has an anode for the electrolysis, and each second subcell 4.2 has a cathode for the electrolysis. Each membrane 4 separates the product gases 10, 30 produced in the respective electrolysis cell 4 during the electrolysis.

The first subcells 4.1 are connected by means of a first feed line 20 and a first return line 25 to a first separator container 5, in which the first product gas 10 produced in the electrolysis cells 4 during the electrolysis and starting liquid 50 are collected. In the first feed line 20, there is a first heat exchanger 21 for thermally regulating starting liquid 50 and a first feed pump 22, by means of which starting liquid 50 is pumped from the first separator container 5 through the first feed line 20 into the first subcells 4.1. The first return line 25 is used to convey the first product gas 10 produced in the electrolysis cells 4 during the electrolysis into the first separator container 5.

The first subcells 4.1, a container volume of the first separator container 5, as well as the first feed line 20 and the first return line 25, form a first electrolyzer volume of the electrolyzer 1. Starting liquid 50 can be delivered to the first separator container 5 through a supply line 13. To this end, the supply line 13 contains a supply pump 11 and a solenoid valve 12, by means of which the supply line 13 can be opened and closed. First product gas 10 can be removed from the first separator container 5 via a first output line 17. In the first output line 17, there is a first pressure regulating valve 16 for regulating a gas pressure of the first product gas 10.

The second subcells 4.2 are connected by means of a second feed line 40 and a second return line 45 to the second separator container 6, in which the second product gas 30 produced in the electrolysis cells 4 during the electrolysis and starting liquid 50 are collected. In the second feed line 40, there is a second heat exchanger 41 for thermally regulating starting liquid 50 and a second feed pump 42, by means of which starting liquid 50 is pumped from the second separator container 6 through the second feed line 40 into the second subcells 4.2. The second return line 45 is used to convey the second product gas 30 produced in the electrolysis cells 4 during the electrolysis into the second separator container 6.

The second subcells 4.2, a container volume of the second separator container 6, as well as the second feed line 40 and the second return line 45, form a second electrolyzer volume of the electrolyzer 1. Starting liquid 50 can be removed from the second separator container 6 through a blow-off line 14. To this end, the blow-off line 14 contains a blow-off valve 31, by means of which the blow-off line 14 can be opened and closed. Second product gas 30 can be removed from the second separator container 6 via a second output line 37. In the second output line 37, there is a second pressure regulating valve 36 for regulating a gas pressure of the second product gas 30.

The embodiment of the test device 3 as represented in FIG. 1 comprises a measuring device 8 for detecting a liquid amount of the starting liquid 50 in each of the two electrolyzer volumes, as well as an evaluation unit (not represented) for determining the liquid flow rate of the starting liquid 50 between the two electrolyzer volumes with the aid of the measurement values detected by the measuring device 8. For each separator container 5, 6, the measuring device 8 comprises a filling level sensor 9 for detecting a filling level of the starting liquid 50 in the container volume of the respective separator container 5, 6, and/or a pressure sensor 15 for detecting a gas pressure in the container volume of the respective separator container 5, 6.

In the exemplary embodiment represented in FIG. 1, for each separator container 5, 6, the measuring device 8 comprises both a filling level sensor 9 and a pressure sensor 15. In simpler exemplary embodiments, the measuring device 8 comprises either a filling level sensor 9 or a pressure sensor 15 for each or for only one of the separator containers 5, 6.

According to a first exemplary embodiment of a method for checking membrane leaktightness of the electrolyzer 1, the electrolysis is interrupted for an interruption time, and a test procedure for checking the membrane leaktightness is carried out during the interruption time. For the test procedure, the two electrolyzer volumes are initially filled with mutually different defined liquid amounts of the starting liquid 50. To this end, one of the two separator containers 5, 6 is filled with starting liquid 50 up to a specified first filling level and the other of the two separator containers 5, 6 is filled with starting liquid 50 up to a specified second filling level, which is different to the first filling level.

In some embodiments, the gas pressures in the two separator containers 5, 6 are furthermore equalized to one another. To this and, for example, the gas pressures in the two electrolyzer volumes are equalized to an ambient pressure in an environment of the electrolyzer 1.

Subsequently, a time requirement for equalization of the liquid amounts in the two electrolyzer volumes is determined with the aid of a liquid flow rate that has been determined between the two electrolyzer volumes. To this end, a difference between the filling levels of the starting liquid 50 and/or between the gas pressures in the two separator containers 5, 6 is repeatedly determined and evaluated by means of the measuring device 8.

The time requirement for equalization of the liquid amounts in the two electrolyzer volumes is, for example, either directly measured by detecting the time until the liquid flow rate vanishes or until a specified liquid amount difference between the liquid amounts or a specified gas pressure difference between the gas pressures in the separator containers 5, 6 is reached, or by determining a time requirement for equalization of the two liquid amounts with the aid of an extrapolation of the detected liquid flow rates.

In some embodiments, a mathematical model of a time variation of the equalization of the liquid amounts may be used to determine the time requirement. For the case in which the liquid filling levels in the separator containers 5, 6 correlate linearly with the liquid amounts, as is the case for common forms of separator containers 5, 6, it is for example assumed that the filling level difference $\Delta h$ between the liquid filling levels in the separator containers 5, 6 decreases exponentially with time t according to $\Delta h(t) = h_0 \cdot \exp(-kt)$, where k is a constant that is a measure of the time requirement for equalization of the liquid filling levels in the two separator containers 5, 6. Evaluation of the logarithmic values $\ln(\Delta h)$ of the measurement values for the filling level difference $\Delta h$ as a function of time t allows approximate determination of the constant k from the slope of the straight line plotted through these logarithmic values.

A leak of at least one membrane 7 is, for example, inferred when the time requirement for equalization of the liquid amounts in the two electrolyzer volumes as determined during the test procedure, is less than a specified time requirement threshold value.

The described test procedure may also be carried out two times in succession, the roles of the separator containers 5, 6 being interchanged so that the first time the test procedure is carried out, for example, the first separator container 5 is filled with a larger liquid amount of the starting liquid 50 than the second separator container 6, while the second time the test procedure is carried out the second separator container 6 is filled with a larger liquid amount of the starting liquid 50 than the first separator container 5. In this way, the reliability of the checking of the membrane leaktightness can be increased since systematic disruptive effects can be found.

As an alternative or in addition, the membrane leaktightness of the electrolyzer 1 is checked during electrolysis. To this end, the test device 3 may comprise an ammeter 60 for detecting an electrolysis current strength of the electrolyzer 1. During electrolysis, an electrolysis current strength is detected by means of the ammeter 60 and a liquid flow rate of the starting liquid 50 between the two electrolyzer volumes is determined by means of the measuring device 8. The liquid flow rate is, for example, in this case determined by determining the time variation of a liquid volume of the starting liquid 50 in at least one of the two electrolyzer volumes. To this end, for example, a time variation of a liquid volume of the starting liquid in the container volume of the separator container 5, 6 of the respective electrolyzer volume is determined by repeatedly detecting and evaluating a filling level of starting liquid 50 in the container volume.

From the liquid flow rate determined and the electrolysis current strength detected, a ratio parameter Q is formed which is proportional to the ratio of the liquid flow rate determined and the electrolysis current strength detected. The ratio parameter Q is used to assess the membrane leaktightness. To this end, a first ratio threshold value $Q_{S1}$ and a second ratio threshold value $Q_{S2}$ for the ratio parameter Q are specified, and a leak of at least one membrane 7 is inferred when the ratio parameter Q exceeds the specified first ratio threshold value $Q_{S1}$ or falls below the second ratio threshold value $Q_{S2}$.

This formation and evaluation of the ratio parameter Q is based on the idea that, particularly when using water as the starting liquid 50, a few molecules of water, which are not involved in the electrolysis reaction, also pass through a membrane 7 with each molecule of hydrogen. In this case, the ratio of these two substance flows is to a good approximation constant. If a leak of a membrane 7 should occur, an additional transport path is formed so that this ratio is perturbed. The water flow rate is quantified with the aid of the time variation of the filling level of the water in the second separator container 6. The water flow rate is given as $$dn_w/dt = c_w \cdot A \cdot dh/dt.  \quad [1]$$

In Equation [1], $n_w$ stands for the water amount in the second separator container 6, $c_w$ stands for the molar concentration of water, A stands for the cross-sectional area of the second separator container 6, and h stands for the filling level of water in the second separator container 6. For example, 55.5 mol/l may be used as a numerical value for $c_w$, temperature effects and possibly existing gas bubbles being neglected in this case. Surprisingly, it has been found that such relatively rough approximations nevertheless lead to a reliable method. The time variation of the filling level is expediently calculated with the aid of a linear regression of the temporally discrete filling level values. For example, 10 values may respectively be employed, which are detected at a time interval of 5 seconds each.

The hydrogen flow through the membranes 7 is calculated with the aid of Faraday's laws. In this case, the number of active electrolysis cells 4 of the cell block 2 and the electrolysis current strength are taken into account. Furthermore, an electrical efficiency of 100% is assumed. The hydrogen flow is given as $$dn_{H2}/dt = a \cdot I/(2 \cdot F). \quad [2]$$

In Equation [2], $n_{H2}$ stands for the amount of hydrogen generated, a stands for the number of active electrolysis cells 4 of the cell block 2, I stands for the electrolysis current strength and F stands for the Faraday constant.

The ratio of the water flow rate according to Equation [1] and the hydrogen flow according to Equation [2] is therefore proportional to the ratio (dh/dt)/I and therefore to the ratio parameter Q.

In the consideration above, the ratio of the flow rates is calculated by means of Equations [1] and [2]. Because of approximations used in this case, the actual values may differ slightly from the values calculated according to Equations [1] and [2]. In the case of intact membranes 7, the ratio of the water flow rate to the hydrogen flow typically assumes a single-figure numerical value, so that for example the numerical value 10 may be set as an upper limit beyond which a membrane 7 is considered defective. In principle, however, constant factors, for example the cross-sectional area A of the second separator container 6 or the number a of active electrolysis cells 4, do not need to be taken into account for the definition of the ratio parameter Q and the ratio threshold values $Q_{S1}$, $Q_{S2}$, so that the pure numerical value (and the unit) of the ratio threshold values $Q_{S1}$, $Q_{S2}$ may be adapted accordingly.

Figure 2:
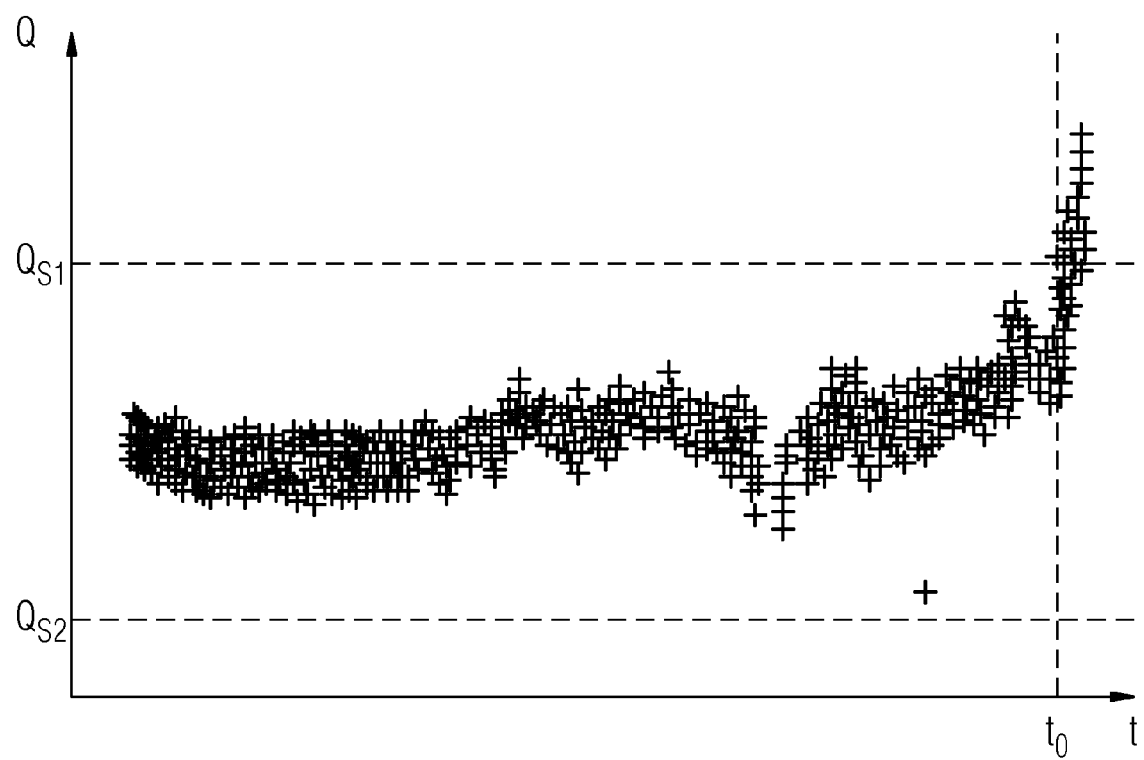
FIG. 2 shows a diagram of a time variation of a ratio parameter.

FIG. 2 shows a diagram of a profile of such a ratio parameter Q as a function of time t, values determined for the ratio parameter Q being represented as crosses. At an overshoot time $t_0$, the ratio parameter Q exceeds the first ratio threshold value $Q_{S1}$. It is inferred therefrom that at least one membrane 7 has a leak at the overshoot time $t_0$. A leak of at least one membrane 7 is correspondingly inferred when the ratio parameter Q falls below the second ratio threshold value $Q_{S2}$. The time fluctuations of the ratio parameter Q are attributable to fluctuations of the electrolysis current strength, the temperature and the system pressure. Although the influences of these fluctuations of the electrolysis current strength, the temperature and the system pressure may be reduced by replacing the ratio parameter Q with a simplified parameter, such a simplification is however generally unnecessary since the effects of a leak of a membrane 7 greatly surpass the influences of fluctuations of the electrolysis current strength, the temperature and the system pressure.

Although the invention has been illustrated and described in detail by exemplary embodiments, the teachings are not restricted to the examples disclosed and other variants may be derived therefrom by the person skilled in the art without departing from the protective scope of the claims below.

What is claimed is:

1. A method for checking a membrane of an electrolyzer for leaking, wherein the electrolyzer comprises two electrolyzer volumes separated from one another by the membrane and produces two product gases from a starting liquid by means of electrolysis, the method comprising:
   during electrolysis, detecting an electrolysis current strength;
   measuring a liquid flow rate of the starting liquid between the two electrolyzer volumes;
   calculating a ratio parameter proportional to the ratio of the measured liquid flow rate and the detected electrolysis current strength detected; and
   using the calculated ratio parameter as an indication of membrane leaktightness.

2. The method as claimed in claim 1, wherein, measuring the liquid flow rate includes determining a time variation of a liquid volume of the starting liquid in at least one of the two electrolyzer volumes.

3. The method as claimed in claim 2, wherein each of the two electrolyzer volumes comprises a container volume of a separator container in which a product gas and starting liquid are collected,
   wherein determining the time variation of a liquid volume of the starting liquid in at least one of the two electrolyzer volumes includes repeatedly detecting and evaluating a filling level of starting liquid in the container volume of the electrolyzer volume.

4. The method as claimed in claim 3, wherein determining the time variation of a liquid volume of the starting liquid in at least one container volume of an electrolyzer volume includes repeatedly detecting and evaluating a gas pressure in the container volume.

5. The method as claimed in claim 1, wherein each of the two electrolyzer volumes comprises a container volume of a separator container in which a product gas and starting liquid are collected, wherein measuring the liquid flow rate includes detecting and evaluating a time variation of a pressure difference between gas pressures in the two container volumes.

6. The method as claimed in claim 1, wherein a first ratio threshold value for the ratio parameter is specified, and a leak of the membrane is inferred when the ratio parameter exceeds the specified first ratio threshold value.

7. The method as claimed in claim 1, wherein a second ratio threshold value for the ratio parameter is specified, and a leak of the membrane is inferred when the ratio parameter falls below the specified second ratio threshold value.

8. The method as claimed in claim 1, further comprising:
   interrupting the electrolysis for an interruption time;
   filling the electrolyzer volumes with different liquid amounts of the starting liquid; and determining an elapsed time for equalization of the liquid amounts in the two electrolyzer volumes with using a liquid flow rate determined during the interruption time.

9. The method as claimed in claim 8, further comprising, before the determination of the time requirement for equalization of the two liquid amounts, equalizing gas pressures in the two electrolyzer volumes to one another.

10. The method as claimed in claim 8, further comprising, before the determination of the time requirement for equalization of the two liquid amounts, equalizing gas pressures in the two electrolyzer volumes to an ambient pressure.

11. The method as claimed in claim 8, wherein the liquid flow rate is determined repeatedly during the interruption time, and the time requirement for equalization of the two liquid amounts is determined with the aid of an extrapolation of the liquid flow rates detected.

12. A test device for checking a membrane of an electrolyzer comprising two electrolyzer volumes separated from one another by the membrane and producing two product gases from a starting liquid by means of electrolysis, the test device comprising:
    an ammeter detecting an electrolysis current strength of the electrolyzer;
    a meter for detecting a liquid amount of the starting liquid in at least one of the two electrolyzer volumes; and
    a processor programmed to determine a liquid flow rate of the starting liquid between the two electrolyzer volumes based at least in part on values detected by the meter;
    the processor further programmed to calculate a ratio parameter proportional to a ratio of the determined liquid flow rate and the detected electrolysis current strength;
    the processor further programmed to use the calculated ratio parameter as an indication of membrane leaktightness.

13. The test device as claimed in claim 12, wherein:
    each of the two electrolyzer volumes comprises a container volume of a separator container, in which a product gas and starting liquid are collected; and
    the meter comprises a filling level sensor detecting a filling level of the starting liquid in a container volume or a pressure sensor for detecting a gas pressure in a container volume.

* * * * *